United States Patent
Rabinovich

(10) Patent No.: US 6,441,338 B1
(45) Date of Patent: Aug. 27, 2002

(54) RAPID MANUFACTURING OF STEEL RULE DIES AND OTHER 3-DIMENSIONAL PRODUCTS, APPARATUS, PROCESS AND PRODUCTS

(76) Inventor: Joshua E. Rabinovich, 15 Voss Ter., Newton, MA (US) 02159

( * ) Notice: Subject to any disclaimer, the term of this patent is extended or adjusted under 35 U.S.C. 154(b) by 0 days.

(21) Appl. No.: 09/546,382

(22) Filed: Apr. 10, 2000

Related U.S. Application Data

(60) Provisional application No. 60/129,916, filed on Apr. 19, 1999.

(51) Int. Cl.[7] .............................................. B23K 31/02

(52) U.S. Cl. ............... 219/121.64; 228/183; 219/76.12; 219/76.14

(58) Field of Search ........................ 219/121.64, 125.1, 219/136, 137 R, 76.1, 76.12, 76.14, 121.66, 121.65; 228/180.5, 183; 148/525; 156/272.8, 180, 166, 296

(56) References Cited

U.S. PATENT DOCUMENTS

| | | | |
|---|---|---|---|
| 1,533,300 A | | 4/1925 | Baker |
| 3,156,968 A | | 11/1964 | White |
| 3,397,440 A | * | 8/1968 | Dalin |
| 3,558,846 A | | 1/1971 | Ujiie |
| 3,737,616 A | | 6/1973 | Ujiie |
| 3,821,840 A | | 7/1974 | Kershaw |
| 3,952,180 A | | 4/1976 | Gnanamuthu |
| 4,323,756 A | | 4/1982 | Brown et al. |
| 4,575,330 A | | 3/1986 | Hull |
| 4,743,733 A | | 5/1988 | Mehta et al. |
| 4,803,334 A | | 2/1989 | Burke et al. |
| 4,841,617 A | | 6/1989 | Schmidt et al. |
| 4,857,693 A | | 8/1989 | Rump |
| 4,863,538 A | | 9/1989 | Deckard |
| 4,931,125 A | | 6/1990 | Volkmann et al. |
| 4,947,463 A | | 8/1990 | Matsuda et al. |

(List continued on next page.)

FOREIGN PATENT DOCUMENTS

| | | |
|---|---|---|
| CA | 678500 | 1/1964 |
| DE | 3905684 | 8/1990 |
| FR | 2583333 | 12/1986 |
| JP | 2-99286 | 4/1990 |
| JP | 4-288974 | 10/1992 |
| WO | 8806564 | 9/1998 |

OTHER PUBLICATIONS

Merriam–Webster's Collegiate Dictionary, definition of "meridian".*
Schaffer, George, "Laser Solves Spotwelding Problems", *Source Book on Electron Beam and Laser Welding*, American Society for Metals, Mar. 7, 1983, pp. 337–340.

*Primary Examiner*—Tom Dunn
*Assistant Examiner*—Colleen P. Cooke
(74) *Attorney, Agent, or Firm*—James Creighton Wray; Meera P. Narasimhan

(57) ABSTRACT

A model building apparatus includes a beam delivery module and a stage movable in the X, Y and Z directions. A feedstock holding mechanism for the model building apparatus enables the model building apparatus to corrugate the feedstock into a latticed layer. The feedstock holding mechanism includes a feeder housing a spool of feedstock and jaws having push-down arms and side-holding arms. Engaging and disengaging of the feedstock by the jaws while moving the table allows for forming a latticed layer of feedstock that is several times thicker than the thickness of the feedstock. Reducing the total number of layers that comprise the model significantly increases the speed of constructing models that do not require solid walls. The latticed layers may be formed in a continuous process without cutting the feedstock prior to adding a new layer of feedstock, thereby improving the quality of the lattice structure due to less cutting and starting of the feedstock. A fully automatic, computer-controlled process of steel rule die-making goes from CAD design to finished die in a minutes, allowing production of any 3-Dimensional steel rule die.

32 Claims, 5 Drawing Sheets

U.S. PATENT DOCUMENTS

| | | | |
|---|---|---|---|
| 5,038,014 A | | 8/1991 | Pratt et al. |
| 5,077,889 A | * | 1/1992 | Matsuda et al. |
| 5,121,329 A | * | 6/1992 | Crump |
| 5,127,364 A | * | 7/1992 | Savkar et al. |
| 5,134,569 A | | 7/1992 | Masters |
| 5,147,587 A | | 9/1992 | Marcus et al. |
| 5,208,431 A | | 5/1993 | Uchiyama et al. |
| 5,233,150 A | | 8/1993 | Schneebeli et al. |
| 5,266,139 A | | 11/1993 | Yokota et al. |
| 5,303,141 A | | 4/1994 | Batchelder et al. |
| 5,312,508 A | * | 5/1994 | Chisolm |
| 5,333,519 A | * | 8/1994 | Holliday et al. |
| 5,578,227 A | | 11/1996 | Rabinovich |
| RE35,522 E | * | 6/1997 | Holliday |
| 5,676,032 A | * | 10/1997 | Johnson |
| 5,738,817 A | * | 4/1998 | Danforth |
| 6,113,696 A | * | 9/2000 | Tseng |
| 6,144,008 A | * | 11/2000 | Rabinovich |
| 6,153,034 A | * | 11/2000 | Lipsker |
| 6,193,923 B1 | * | 2/2001 | Leyden et al. |

\* cited by examiner

RAPID MANUFACTURING OF STEEL RULE DIES AND OTHER 3-DIMENSIONAL PRODUCTS, APPARATUS, PROCESS AND PRODUCTS

This application is claims the benefit of U.S. Provisional Application No. 60/129,916, filed Apr. 19, 1999.

BACKGROUND OF THE INVENTION

Prototype modeling is a well known tool used during the design of model items and parts and components of complex systems. Typically, 3-Dimensional prototype models are used to test items and components prior to actual manufacture. Numerous 3-Dimensional model rapid prototyping methods are known. In particular, the method disclosed in U.S. Pat. No. 5,578,227 to Rabinovich, which is explicitly incorporated herein by reference, is particularly effective.

The steel rule die-cutting and die-making tools industry market amounts to about $6 billion worldwide. The industry provides services and die equipment to the converting industry markets, which include the producers of carton packaging boxes, automotive interior parts, gaskets, and tags & labels, to name a few. Packaging is an essential part of the American economy. About 90 percent of all products in this country are sold or moved through shipping cartons or corrugated boxes; from McDonald's corrugated clamshells for its Big Mac sandwiches to Nike's shoe boxes shipped around the world.

As reported by the Corrugated Packaging Council, the main association of the corrugated converting industry, the corrugated boxes converting industry segment is a $19 billion per year industry. That is the largest segment of the entire packaging industry. The State of the Industry report published in the March 1998 issue of Package Printing and Converting Magazine reports that, currently, the value of production for the North American folding carton-converting segment is about $6.8 billion. Added to this is an estimated $8 billion for the tags and labels segment. Those three segments of the converting industry constitute a $33.8 billion per year market, which is supported by the steel rule die making industry.

Small companies dominate the die-cutting and die-making industry. For generations they have been producing steel rule dies with methods that demand a high degree of craftsmanship and labor intensive operations.

Dies are called "steel rule dies" because the cutting and creasing blades resemble in height and thickness the width and thickness of steel rules. The following description details how steel rule dies are currently manufactured.

Sharpened and flat steel rule blades are bent and formed into a cutting and creasing pattern. The blades are held in position in a plywood, plastic, or metal die board. The die board is laser-grooved to accept and support the blades. In an operation called "knifing," a skilled die maker manually inserts and secures the backs of thin pre-bent blades into the grooved die board. Sharp edge blades are used for cutting; creasing blades have rounded edges. The die maker then manually adjusts the height of the cutting and creasing blades by means of shims placed between the press and the back of the grooved die board holding the blades. The skilled die maker drives the die blades into the grooves in the die board by striking the sharpened cutting edges and rounded creasing edges with a plastic mallet. The die and the material to be cut are then placed in a press for the cutting operation.

With the increased automation on the converter's side of the business, the demands for die accuracy and performance have been steadily increasing during the last two decades. Customer's demands for greater die accuracy and performance are escalating. Those demands have forced many die-makers to purchase $350,000 groove-making laser systems and $120,000 automatic steel rule die bending machines to improve die accuracy and quality.

A finished die made with existing manufacturing methods requires labor intensive work, brings about slow customer delivery, and causes equipment down time due to loose rules falling out of the die board and consequent die re-ruling.

The main labor-intensive operations, such as the knifing of the die board and the knife's height adjustment, are main contributors to increased die cost and slow customer delivery. For example, out of a total of forty-two (42) hours required for production of a benchmark die for fifty-two cigarette cartons, thirty (30) hours are spent on manual operations.

Therefore, a need exists for a more efficient and inexpensive method of producing steel rule dies. A need also exists, therefore, for a 3-Dimensional model rapid manufacturing method capable of generating 3-Dimensional models on flat and/or curved surfaces as a cylindrical or more complex 3-D surface used for a steel rule die base. The method may also generate corrugated structures, which may be used for speeding up steel rule build up. A need also exists for higher quality dies that are produced in shorter time frames and at reduced costs.

SUMMARY OF THE INVENTION

The improvements are achieved with the following additions to a basic solid feedstock deposition process described in U.S. Pat. No. 5,578,227 and application Ser. No. 08/755,214, which are hereby incorporated by reference.

An improvement is the addition of a means for continuous relative positioning of the feedstock deposition head and/or base so that feedstock is tangent to a base at the point of laser beam impeachment with the surface.

Other improvements are the provision of special feedstocks and the addition of V-shaped and rounded edges in feedstocks, which allow for the production of cutting and creasing blades used in steel rule die making, with or without additional milling or sharpening operations.

New steel rule die systems, processes, apparatus, and manufactured dies and feedstocks are presented by this invention.

A steel rule die is a cutting tool similar in form and function to a cookie cutter. There is an immediate opportunity to enter that market as an original equipment manufacturer (OEM) supplier of revolutionary steel rule die-making machines, process, and products.

A manufacturing process and system has been developed that is capable of automatically producing any 3-Dimensional steel rule die. The key element of this system is a Solid Feedstock Deposition (SFD) process, in which a solid flat feedstock of metal is laser fused, welded, brazed, or bonded onto a substrate and/or onto previously similarly fixed layers. This process and system is utilized in a steel rule die-making machine for an automatic direct deposition, fixing, and shaping of cutting and creasing blades.

The following description details how the new steel rule die-making machine works. The new steel rule in the form of a spooled flat wire is laser fused, welded, brazed, or bonded directly onto a die board, metal or nonmetal, and/or onto previous wire layers. Edges of outer layers are sharpened, triangular or rounded for cutting or creasing.

Computer aided design and/or computer aided manufacturing (CAD/CAM) control the cutting and creasing patterns. The height of the steel rule die is controlled by the number of layers deposited. The machine sharpens the cutting areas of the die pattern. For many applications only a single pass of the wire is required. The entire process is fully automated. As is necessary in existing methods, the present invention requires no grooving of die boards, no separate rule bending, and no manual rule fitting into the grooves.

The present process and system bring revolutionary benefits to the steel rule die cutting industry by significantly reducing the die manufacturing costs, while improving die quality and expanding die capability.

The new steel rule die-making technology competes against established capital equipment manufacturers who supply equipment to the steel rule die-making industry for die board groove cutting and steel rule bending operations.

The new method of production of steel rule dies brings dramatic advantages in terms of production costs, quality, and customer response.

Another competing technology is the chemical etching approach used for the production of cutting dies. Although, chemical etching can produce cutting dies without the grooving and steel rule bending operations, chemical etching has a number of significant limitations that dramatically weakens their competitive position. That process produces a negative environmental impact. Chemical etching requires intensive disposal, treatment, and handling equipment that is extremely costly. The process is inherently slow. The chemical etching method is limited to processing of very thin materials, due to the limited rule height that is producible with that method.

The new steel rule dies, systems, manufacturing processes and machines, the resulting products, and the wires employed are features of the invention.

In the operations of the invention, the locating wire delivering bending, fixing, and sharpening head may move in X, Y, Z planar and arcuate directions and in rotation. The die plate holding and positioning table may similarly move. Movements of the head or table may be limited or interrelated. The die plate may be flat, cylindrical, undivided or segmental. In either case, the table may revolve or rotate and/or the head may revolve or rotate.

The present invention also provides for generating 3-Dimensional models that include layers of latticed feedstock. Layers of latticed feedstock may be used for the production of independent structural components or they may be used as filling techniques for internal cavities.

A model building apparatus includes a beam delivery module and a stage movable in the X, Y and Z directions. The model building apparatus dispenses feedstock, typically in the form of a thin strip of material such as stainless steel, onto a substrate. As used herein, substrate refers to the next, below or adjacent layer to which the feedstock is welded. The feedstock is formed into layers to construct a 3-Dimensional model. Each successive layer is fused to the immediately preceding layer until the complete model has been constructed. The present invention is a feedstock holding mechanism for a model building apparatus that enables the model building apparatus to corrugate the feedstock into a latticed layer. Generating 3-Dimensional models with latticed layers of corrugated feedstock significantly reduces the total amount of feedstock needed to make a given part.

The feedstock holding mechanism includes a feeder housing a spool of feedstock and jaws having push-down arms and side-holding arms. In operation, the substrate is fixed on the table, and the flat wire feedstock is held in the jaws while being spot welded or fused to the substrate by the beam delivery module, which may include a laser or electron beam or a plasma jet heating device of another energy source. The feedstock holding mechanism holds the feedstock to the substrate at its initial point of deposition, which improves the quality of the fusion at this point of first engagement of the feedstock with the substrate. After the initial point of the wire is fused, the jaws then release the feedstock and the stage moves horizontally away from the feeder thereby causing the material to be drawn from the feeder. The jaws are engaged and the table moves back toward the jaws, causing the feedstock to bend upward and downward, thereby corrugating the feedstock. The feedstock is then welded to the substrate at the endpoint of a corrugated wave. A top straight layer is then deposited. This process is repeated thereby forming a latticed layer of feedstock which is several times thicker than the thickness of the feedstock. Reducing the total number of layers that comprise the model significantly increases the speed of constructing models that do not require solid walls. During the above described process, the stage may be moved slightly downward and then upward during the away and return strokes to aid in the forming of the corrugation. Thus, the jaw and the feeder may move sequentially in the release, away, grip and back repetitive steps or in the away, up, grip, down and back repetitive steps. After each sequence of repetitive steps, the stage positions the substrate in a new position for the next weld. The size of the corrugation is controlled by controlling the length of the cyclic stroke.

The substrate 15 upon which the feedstock is deposited may be curved, such as cylindrical, or any free form 3-Dimensional substrate, in addition to being a flat plate. Rotary dies are used in many applications, such as cutting of labels, envelopes, flexible printed boards, and membrane switches. The production of rotary dies is much more complicated and expensive than the production of flat dies using current die manufacturing technologies, such as etching and hard tooling (machining of the cutting knives on cylindrical surfaces on a computer controlled milling machine). The present invention provides a significant reduction in the costs and time required to manufacture rotary dies.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
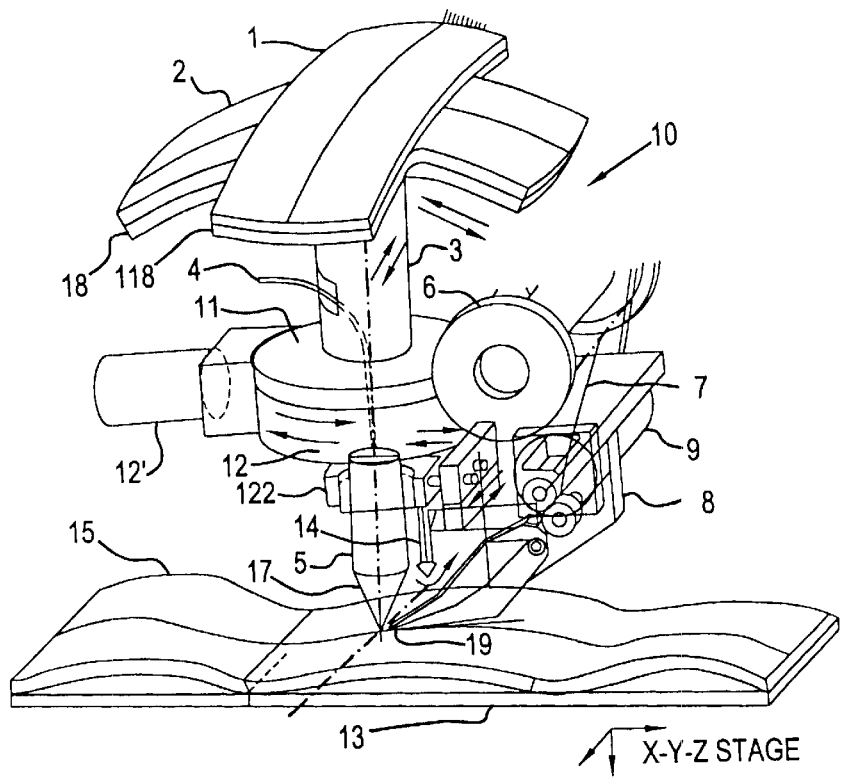
FIG. 1 is a perspective view of one solid feedstock positioning, bending, fixing, and sharpening head movable in conjunction with a movable die plate supporting and holding table.
Figure 2:
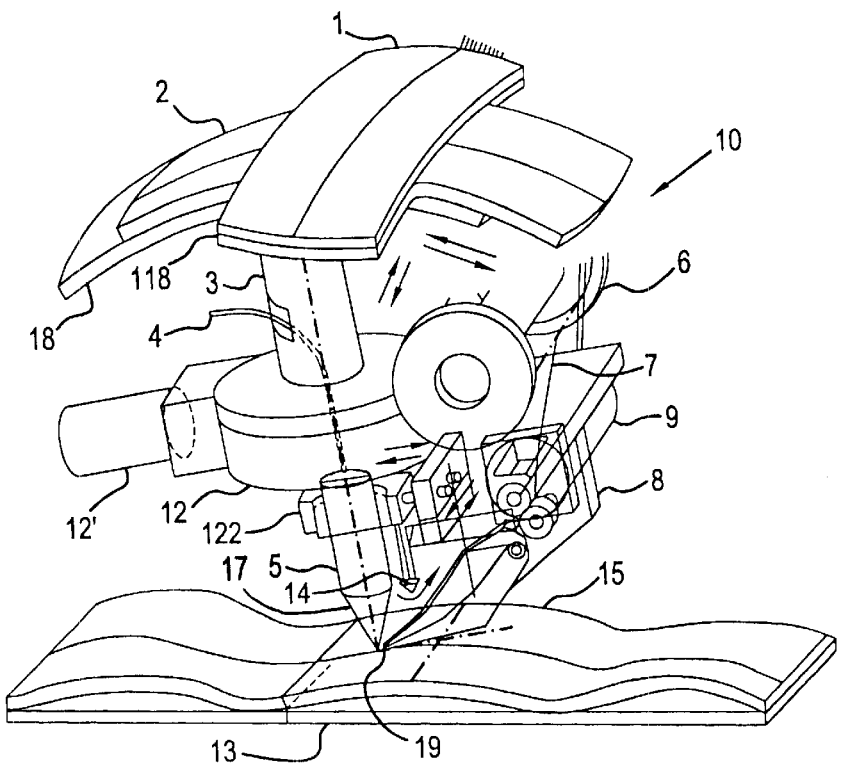
FIG. 2 is a perspective view of the feedstock head and table relatively relocated to maintain the laser head perpendicular to the stage as the stage moves.
Figure 15:
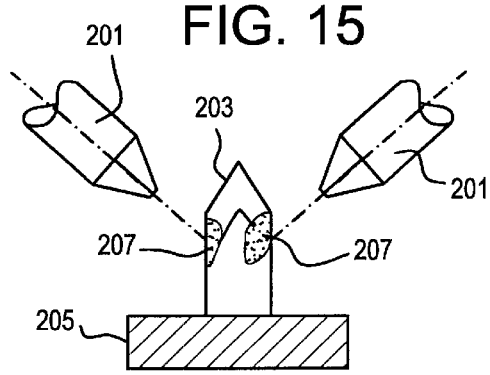
FIG. 15 is a front view of a feedstock head with multiple laser focus heads.

As shown in FIGS. 1 and 2, a head 10 and a table 13 relatively move. A laser beam for fusing, welding, brazing, or bonding is delivered in this arrangement through a fiberoptic cable 4, ending with a focus head 5 and process gas nozzle 17. As shown in FIG. 15, multiple laser focus heads 201 may be used. Multiple laser focus heads 201 may be used for deposition of V-shaped deposition wires 203 on a substrate 205. Multiple laser focus heads 201 may also be used for the deposition of rectangular feedstock wire. Multiple laser focus heads permits side welds 207 of the feedstock deposition wire 203. Nitrogen is one gas that may be used as the process gas. The focus head and gas nozzle is attached to platform 122, movable by servo motors in its own X', Y', Z' coordinates, with the Z' coordinate coinciding with the main laser beam axis.

The feedstock directing, depositing and bending wire deposition nozzle 19 is continuously positioning the feedstock tangent to a curvature of the die plate or base 15 at the point of laser beam impingement with the die plate or feedstock surface, as shown in FIGS. 1 and 2. Frame members 18 and 118 are contoured to allow the Z axis of head 10 to be positioned perpendicularly to any point of the base 15. Frame member 1 is fixedly mounted. Frame member 118 is slidably connected to frame member 1 allowing frame members 2 and 18 meridian movement and frame member 2 is slidably connected to frame member 118 allowing longitudinal movement, as shown by the arrows. Thus, the Z axis of head 10 may be rotated in a spherical coordinate axis, with the center of rotation being at the laser point of impingement with the substrate. The rotary stage 12 rotates upon the feedstock delivery support 11 rotates upon rotary stage 12, as shown by the curved arrows, to align feedstock wire deposition nozzle 19 tangentially to the direction of movement. The substrate may be any shape, such as a cylindrical substrate 209 shown in FIG. 14.

A spool 6 holds a coil of wire 7. Servo motors drive straighteners 9 which uncoil, straighten, and feed the wire 7. Support 8 is connected to rotatable support 12 to hold the spool 6 coiled wire 7 straighten feeders 9 and wire deposition nozzle 19. A grinder 14 sharpens edges of cutting blades, and similar milling and shaping tools for cleaning and shaping the wire.

Figure 16A:
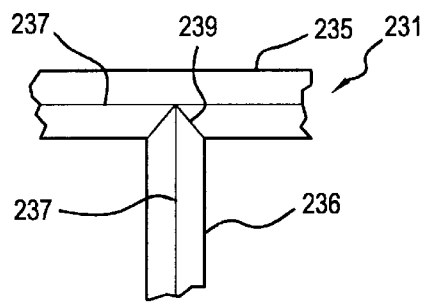
FIGS. 16A, 16B and 16C are top, front and perspective views of a T-junction.
Figure 16B:
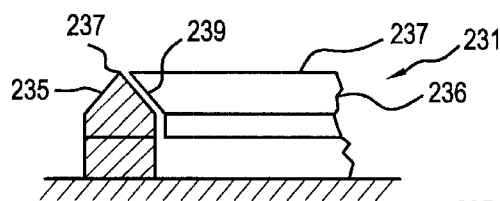
Figure 16C:
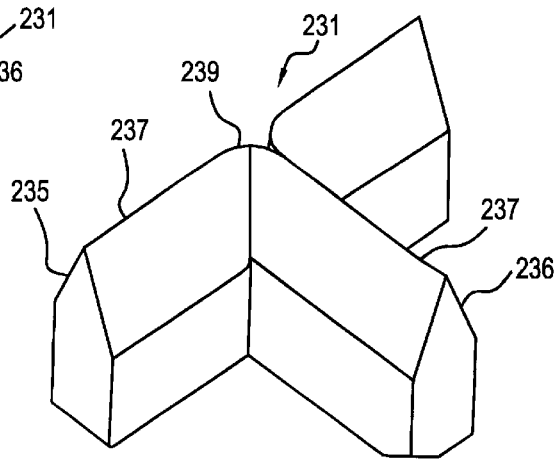
Figure 17A:
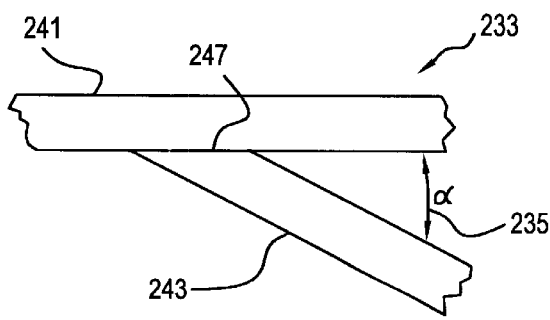
FIGS. 17A and 17B are top and perspective views of a Y-junction.
Figure 17B:
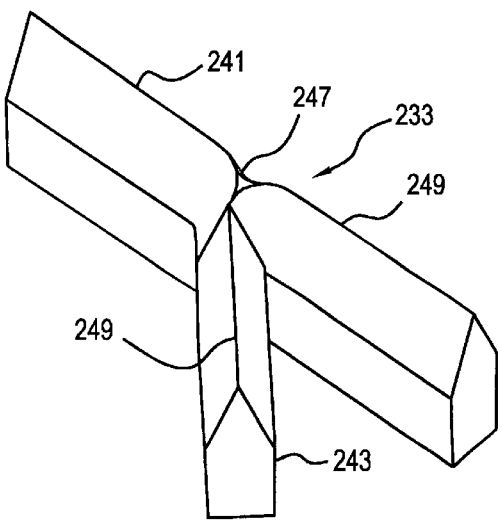

A wire trimming device (not shown) comprises a sharpening tool that shapes the end of the wire prior to deposition allowing a gap free fit in a junction with another wire such as in a T-junction 231, shown in FIGS. 16A, 16B and 16C, a Y-junction 233, shown in FIGS. 17A and 17B, or other junctions. FIG. 16A is a top view of a T-junction 231 made up of pre-sharpened wire 235 and 236, such as with a V-shaped wire, so that the top layer comes to a sharp point 237. As shown in FIG. 16B, the wire trimming device may be used to trim the wire 236 prior to deposition so that there is a mitred point 239 at the junction of the two wires 235 and 236. FIG. 17A is a top view of a Y-junction 233 made up of wires 241 and 243 prior to sharpening. Wire 243 is trimmed prior to deposition for a mitred point between wire 241 and 243 at a predetermined angle α 245. FIG. 17B shows a Y-junction 233 after wires 241 and 243 have been sharpened to a point 249 by a chamfering tool. This wire-trimming device is accessible to the wire delivery nozzle and may be located on the periphery of the X-Y-Z table, or any of several other suitable locations.

Figure 14:
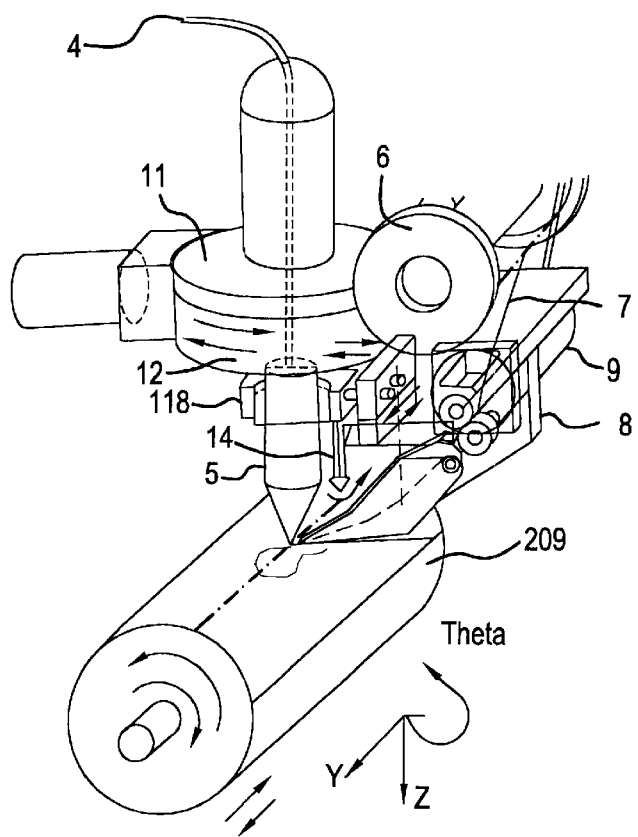
FIG. 14 is a perspective view of a feedstock head depositing feedstock on a cylindrical substrate.

The substrate 15 upon which the feedstock is deposited may be curved, such as a cylindrical substrate 209 as shown in FIG. 14, or any free form 3-Dimensional substrate, in addition to being a flat plate. For a cylindrical substrate, as shown in FIG. 14, the substrate is moveable in theta-y-z directions, as compared to x-y-z directions for a flat plate substrate, as shown in FIGS. 1 and 2.

Figure 3A:
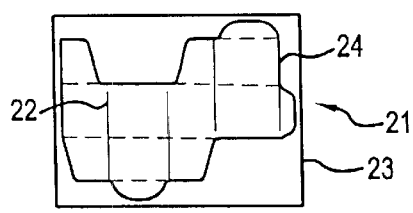
FIGS. 3A and 3B are top and side views of a steel rule die.
Figure 3B:
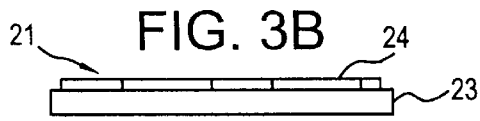

FIGS. 3A and 3B show a typical configuration for a single carton box steel rule die 21 produced on a flat die plate, base, or die board 23 having creasing knives 22 and cutting knives 24. A flat die board die 21 is used on a flat bed press.

Figure 4A:
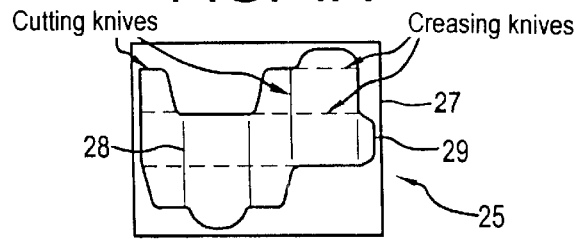
FIGS. 4A and 4B are top and side views of a curved or rotary steel rule die formed on a curved or cylindrical die plate.
Figure 4B:
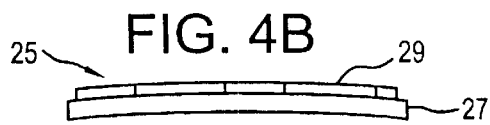
Figure 5A:
FIGS. 5A, 5B, 5C and 5D are end views of feedstocks for forming and building creasing and cutting blades.
Figure 5B:
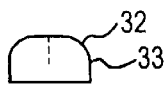

FIGS. 4A and 4B show the same sample die 25 produced on a cylindrical surface 27, such as the surface 15 shown in FIGS. 1 and 2, using the previously described elements. The rotary die 25 is another type of steel rule die. The rotary dies 25 are installed on the periphery of a rotary press cylinder. For this type of die the curvature of the die board 27 must fit the curvature of the rotary cylinder, and the creasing knives 28 and the cutting knives 29 must conform to the curvature of the curved surface. Steel rule dies may be produced with rectangularly-shaped wires 31 and 33, as shown in FIGS. 5A and 5B. Top wires 33 have rounded edges 32 to form creasing blades (22 and 28 of FIGS. 3A and 4A) or to reduce the amount of material to be abraded when forming cutting blades (24 and 29 of FIGS. 3A and 4A). Die blades may be fused, welded, brazed, soldered, or bonded and built-up layer by layer to a desired blade height. The top layer of these built-up blades may be milled flat with a milling tool (not shown) and then sharpened with a chamfering tool 14, FIG. 1, and then edge hardened. The edge hardening may be done by heating the desired surfaces with the laser beam, and then cooling the surfaces with a jet of a compressed air or other cooling agent. All this may be done in-process without removing the die from the machine.

V-shaped base feedstocks, shown in FIGS. 5C, 5D, 6B and 6C allow for the production of cutting and creasing blades used in steel rule dies without additional milling operations.

Figure 5C:
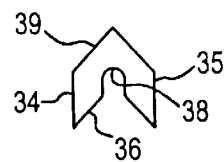
Figure 5D:
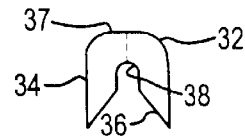

FIGS. 5C and 5D show possible chevron or inverted V-shaped wire profiles 35 and 37. The V-shaped profiles 35 and 37 allow for saving on the sharpening operation and provide strength and stability. Sharpening would be necessary, when a flat wire is used to form a cutting knife, as shown by dashed lines 42 at the top of FIG. 6A. Preferably all of the V-shaped profiles have straight side walls 34 and sloped bases 36. Central recess 38 allows the sloped tops 39 to fit tightly against sloped bases 36 without requiring an accurate intersection between the base surfaces 36. Recesses 38 provide a repository for lower-melting bonding, soldering, or brazing material which may flow between the base surfaces 36 and complementary top surfaces 39 as the two are pressed together with heating. The profile 35 is used as a building and cutting blade topping wire. The profile 37 is used as a creasing blade topping wire. An additional advantage that may be realized with the V-shaped profiles 35, 37 is their ability to build up blades with bonding or soldering methods that require less heat input than welding methods. This may be an important feature when the top cutting edge 41, of FIG. 6B, is, for example, diamond coated, and the welding operation might damage the coating. Several possible combinations of blades 43, 45 and 47 built-up by using different feedstock profiles are shown in FIGS. 6A, 6B and 6C.

Figure 6A:
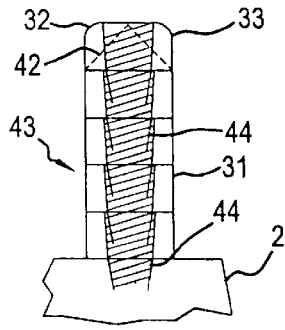
FIGS. 6A, 6B and 6C are front views of feedstocks built up to form blades.
Figure 6B:
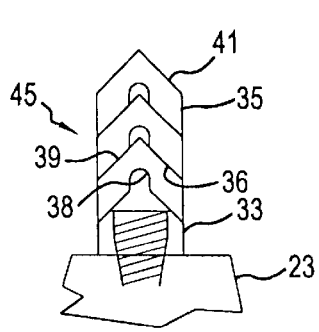

FIG. 6A shows a blade 43 built up by laser heat fusing 44 several layers of flat wires 31 to each other after fusing the first layer to the die plate base 23 (15 or 27). The top layer 33 has rounded corners 32 which may be cut away to form the slopes 42.

FIG. 6B shows a cutting blade 45 with a sharp top 41 built of soldered, brazed, or bonded layers 35 after a bottom layer 33 is first fused to die plate base 23. The top side corners of layer 33 may be cut to a slope complementary to slope 36. Alternatively, a special flat bottom, sloped top wire may be used for the first layer.

Figure 6C:
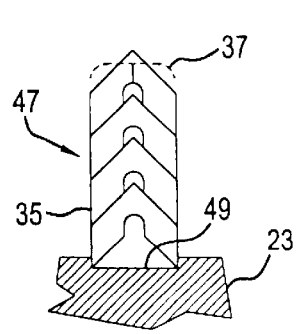

As shown in FIG. 6C in building a cutting blade 47, a groove 49 is first precut with a milling tool (not shown), similar to the chamfering tool 14, within die plate base 23 before wires 35 are layered and fused. The bottom layer 50 may be a special flat bottom, sloped top wire profile.

Figure 7:
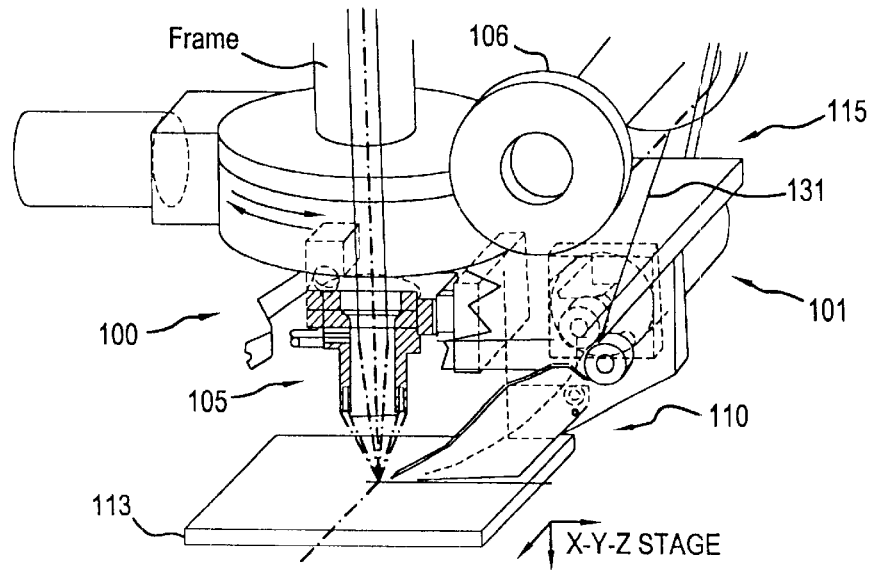
FIG. 7 is an isometric view of the invented feedstock holding mechanism for a 3-Dimensional modeling apparatus having a jaw mechanism for corrugating feedstock to create a latticed layer used to generate a 3-Dimensional model.

The invented feedstock holding mechanism 101 for a modeling apparatus 100 for corrugating feedstock 131 into a latticed layer 133 (shown in FIG. 12B) used to generate a 3-Dimensional model is shown in FIG. 7.

As shown in FIG. 7, the model building apparatus 100 includes a beam delivery module 105 and a stage 113 movable in the X, Y and Z directions. The model building apparatus 100 dispenses feedstock 131, typically in the form of a thin strip of material such as stainless steel, onto a substrate 132 (shown in FIG. 8). The feedstock holding mechanism 101 includes a feeder 115 housing a spool 106 of feedstock 131 and jaws 110 for corrugating feedstock 131 into a latticed layer 133.

Figure 10:
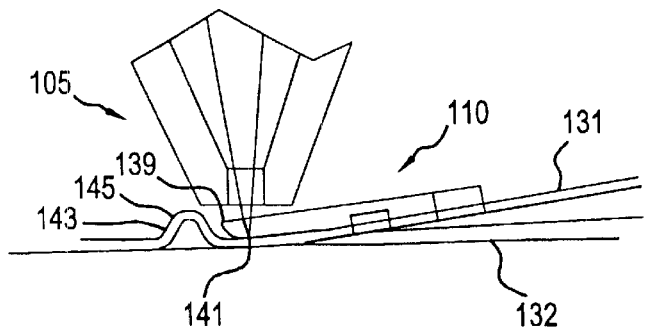
FIG. 10 is a side view showing the stage moving back toward the engaged jaw mechanism, bending the feedstock toward it.
Figure 11:
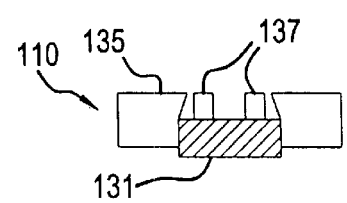
FIG. 11 is a cross-sectional end view of the top elevation of the jaw mechanism of FIG. 1.

FIG. 11 is a cross-sectional end view of the jaw 110. A side-hold arm 135 is positioned on either side of the feedstock 131. Push-down arms 137 are spaced apart and are positioned over the top surface 130 of the feedstock 131. The push-down arms 137 are angled toward the feedstock 131 and have rounded tips 139, as shown in FIGS. 8–10.

Figure 8:
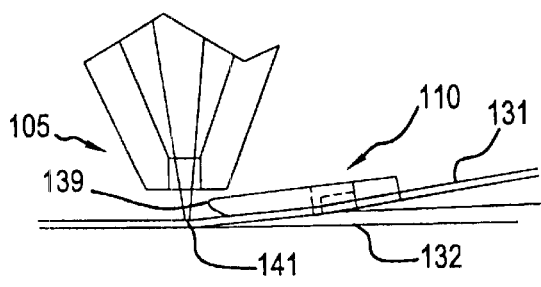
FIG. 8 is a side view showing the jaw mechanism depositing the feedstock onto the substrate, for welding the feedstock to the substrate.
Figure 9:
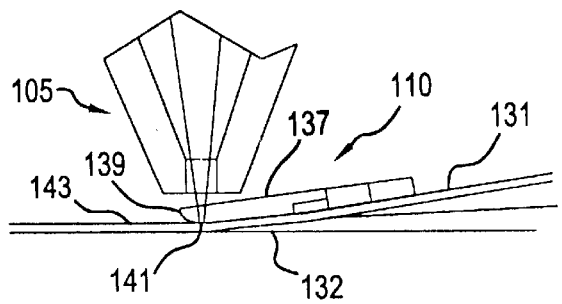
FIG. 9 is a side view showing the stage moving away from the disengaged jaw mechanism drawing the feedstock with it.

FIGS. 8 through 10 show sequentially the movement of the jaw 110 which corrugates the thin, continuous feedstock 131 into a latticed layer 133. Initially, the feedstock 131 is fused to the substrate 132 and the jaw 110 is in a disengaged position, as shown in FIG. 8. The jaw 110 then moves to an engaged position, shown in FIGS. 9 and 10. Because the feedstock 131 is fused to the substrate 132, movement of the push-down arms 137 toward the point 141 at which the feedstock 131 is attached to the substrate forces the intermediate segment 143 of feedstock 131 to bend or corrugate 145. The side-hold arms 135 and the push-down arms 137 act simultaneously to corrugate or bend the feedstock 131 in the direction above the substrate thereby creating a latticed layer 133 of feedstock having a girth several times larger than the thickness of the feedstock 131. The girth of each corrugation 145 is directly proportional to the length of the intermediate segment 143 which is also referred to as the pitch. The side-hold arms 137 prevent unwanted lateral movement of the feedstock 131, while the push-down arms 135 corrugate the feedstock 131.

In operation, the substrate 132 is fixed on the table 113, and the flat wire feedstock 131 is held in the jaws 110 while being spot welded or fused to the substrate by the beam delivery module 105, which may include a laser or electron beam or a plasma jet heating device. The feedstock holding mechanism 110 holds the feedstock 131 to the substrate 132 at its initial point of deposition, which improves the quality of the fusion at this point of first engagement of the feedstock with the substrate. The jaws 110 then release the feedstock 131 and the stage 113 moves horizontally away from the feeder thereby causing the material to be drawn from the feeder. The jaws 110 are engaged and the table 113 moves back toward the jaws, causing the feedstock 131 to bend upward and downward and thereby corrugating the feedstock. The feedstock 131 is then welded to the substrate 132 at the end point of a corrugated wave. A top straight layer is then deposited. This process is repeated thereby forming a latticed layer 133 of feedstock 131 that is several times thicker than the thickness of the feedstock.

Reducing the total number of layers that comprise the model significantly increases the speed of constructing models that do not require solid walls. During the above described process, the stage may be moved slightly downward and then upward during the away and return strokes to aid in the forming of the corrugation. Thus, the jaw and the feeder may move sequentially in the release, away, grip and back repetitive steps or in the away, up, grip, down and back repetitive steps. After each sequence of repetitive steps, the stage positions the substrate in a new position for the next weld. The size of the corrugation is controlled by controlling the length of the cyclic stroke.

Figure 12A:
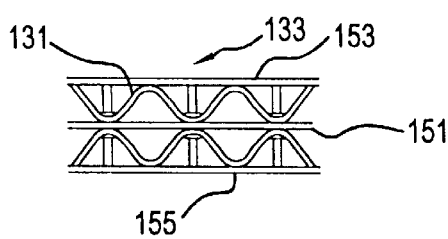
FIGS. 12A and 12B show side and top views of the latticed layer of corrugated feedstock formed by the invented jaw mechanism.
Figure 12B:
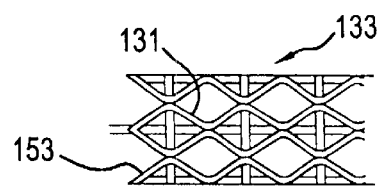

FIGS. 12A and 12B show a detailed side view and top view of several latticed layers 133 of corrugated feedstock 131 used to generate 3-Dimensional models. A middle layer 151 is positioned between a top latticed layer 153 and a bottom latticed layer 155.

In a preferred embodiment, the latticed layers are formed in a continuous process without cutting the feedstock prior to adding a new layer of feedstock. Because the feedstock undergoes less cutting and starting, the quality of the lattice structure is improved. Furthermore, the speed at which the material is deposited is significantly increased thereby reducing the time needed to make a 3-Dimensional model. In another embodiment, the generation of a latticed layer is accomplished with layer-by-layer construction.

Figure 12C:
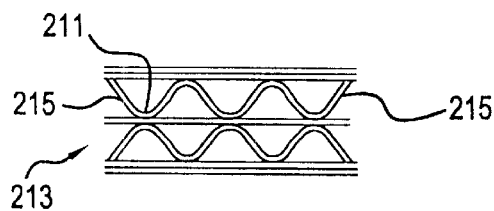
FIGS. 12C and 12D show side and front views of a steel rule die knife created by corrugated feedstock deposition having a sharpened top layer.
Figure 12D:
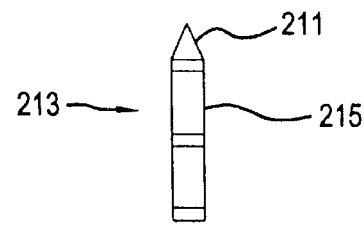

FIGS. 12C and 12D show a steel rule die 213 built up of corrugated layers 215 of feedstock generated using the corrugated method of feedstock deposition. The top layer 211 has been sharpened for use a cutting knife.

Figure 13:
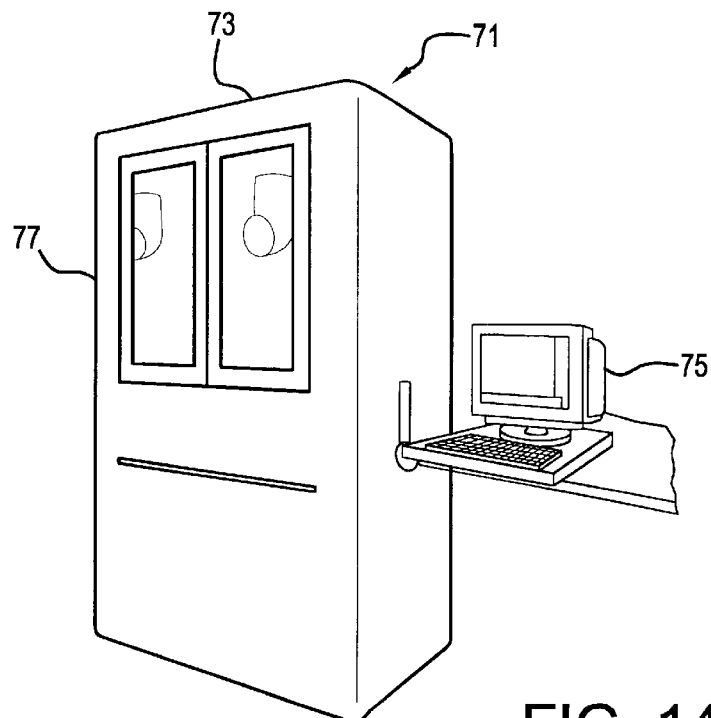
FIG. 13 is a perspective view of apparatus for automatically creating a steel rule die.

The present invention also includes a fully automatic, computer-controlled apparatus 71 and process of steel rule die-making that goes from CAD design to finished die in a fraction of the time that it takes with existing manufacturing methods, as shown in FIG. 13. The apparatus 71 and method produce finished dies in a matter of minutes. The finished dies have the extreme accuracy and intricacy required by today's advanced product designs.

The apparatus and method are capable of automatically producing any 3-Dimensional steel rule die. Feedstock metal is fused by a laser onto a substrate, shown in FIGS. 1, 7 or 14, by apparatus housed within cabinet 73, as shown in FIG. 13. Following deposition, built-in tools automatically smooth and then sharpen the blade edge to the exact cutting angle specified. The steel rule is laser-fused directly onto a metal die board from spooled flat wire. A CAD/CAM design file controls the cutting and creasing patterns for dramatic improvements in accuracy and performance. The thickness of a single layer may be up to 0.020 inch (½ mm). The height of the rule is determined by the number of layers deposited. The machine then automatically sharpens the cutting area of the die pattern. In many applications, only a single pass of wire is needed.

The apparatus and method of the present invention eliminate the requirement of grooving of die boards. The invention also eliminates the need for rule bending and manual rule fitting, as well as eliminating the storage problem for materials and finished dies.

The first step of the method involves loading a disk containing CAD information pertaining to the steel rule die into a computer 75. Next, the metal die board is placed onto a magnetized stage within the cabinet 73 and the cabinet doors 77 are closed. Next, the design file is called up from the CAD program and the parameters are set. The rest of the process is then automatically completed. In minutes a sharpened die has been produced.

In a preferred embodiment, a 120 watt YAG laser is used. Preferably an inert gas, such as nitrogen or argon, are used as the process gas. Preferably the width of the feedstock is either 0.50 or 0.71 mm, deposited in a layer ranging from between 0.25 to 0.50 mm.

While the invention has been described with reference to specific embodiments, modifications and variations of the invention may be constructed without departing from the scope of the invention, which is defined in the following claims.

I claim:

1. A model building apparatus comprising a first frame member, a second frame member slidably connected to the first frame member for moving the second frame member independently with respect to the first frame member, a vertical support connected to the second frame member, a rotary stage connected to the vertical support, a platform connected to the rotary stage, a beam source connected to the rotary stage, a focus head and a beam delivery nozzle mounted on the platform, a feedstock delivery module mounted on the platform, a feedstock storing spool mounted on the feedstock delivery module and feedstock stored on the spool, a feedstock nozzle connected to the feedstock delivery module for receiving feedstock from the spool and feeder and for extending feedstock from a tip of the nozzle, the tip of the nozzle being aligned with a beam projected from the beam source to the focus head and through the beam delivery nozzle, a 3-dimensionally movable stage positioned beneath the nozzle for receiving feedstock in a predetermined pattern according to relative movement of the stage for receiving the feedstock extending from the nozzle tip and for fusing the feedstock to a substrate or to a previously fused layer of the feedstock for constructing a model by depositing and fusing successive layers of the feedstock.

2. The apparatus of claim 1, wherein the feedstock feeder comprises jaws for holding and releasing the feedstock during feedstock deposition for corrugating the deposited feedstock on the substrate.

3. The apparatus of claim 2, wherein the jaws comprise at least one push-down arm and at least one side-holding arm for holding and releasing the feedstock during deposition on the substrate.

4. The apparatus of claim 1, wherein the beam source is selected from a group consisting of a laser beam, an electron beam, or a plasma jet heating device.

5. The apparatus of claim 1, further comprising at least one tool for treating the predeposited or deposited feedstock.

6. The apparatus of claim 5, wherein the at least one tool has a shape or configuration.

7. The apparatus of claim 1, wherein the focus head and beam delivery nozzle comprise a plurality of focus heads and beam delivery nozzles.

8. The apparatus of claim 1, further comprising a motor connected to the spool for driving the spool and delivering the feedstock stored on the spool.

9. The apparatus of claim 1, wherein the first and second frame members are curved.

10. The apparatus of claim 1, wherein the substrate is a curved substrate.

11. The apparatus of claim 1, wherein the feedstock has a rectangular cross-section, and wherein an upper surface and a lower surface of the feedstock are flat for mating the upper surface of a first layer with the lower surface of a second layer.

12. The apparatus of claim 1, wherein the feedstock has an inverted-V cross-section, and wherein an upper surface of the feedstock is sharp, and a lower surface of the feedstock has a recess for mating with the upper surface of the feedstock.

13. The apparatus of claim 12, wherein the feedstock has an upper surface and a lower surface, wherein the lower surface has a recess for mating with the upper surface of a first layer and the upper surface is rounded for use as a creasing knife.

14. The apparatus of claim 1, further comprising a computer for controlling movement of the second frame member, the rotary stage, the platform, and the stage for automatically controlling deposition of the feedstock on the substrate.

15. A steel rule die producing method comprising delivering feedstock to a substrate that is secured to a stage that is movable in three dimensions, securing an initial layer of the feedstock to the substrate, moving the stage for creating a pattern with the deposited feedstock, securing a subsequent layer of feedstock to a previous layer of feedstock, and repeating the securing of subsequent layers of feedstock by moving the stage in three dimensions until a desired height of the steel rule die is obtained.

16. The method of claim 15, wherein the securing the feedstock is selected from a group consisting of fusing, welding, brazing, soldering, and bonding.

17. The method of claim 16, further comprising controlling the moving the stage by a computer for controlling shaping of the steel rule die.

18. The method of claim 15, further comprising sharpening an uppermost layer of feedstock where a cutting pattern in the steel rule die is desired, and shaping or rounding the uppermost layer of feedstock where a creasing pattern in the steel rule die is desired.

19. The method of claim 18, further comprising controlling the sharpening or shaping by a computer.

20. The method of claim 15, wherein the delivering feedstock to a substrate comprises continuously delivering feedstock to a substrate.

21. A steel rule die producing method comprising delivering feedstock to a substrate that is secured to a stage that is movable in three dimensions, securing an initial layer of the feedstock to the substrate, moving the stage for creating a pattern with the deposited feedstock, securing a subsequent layer of feedstock to a previous layer of feedstock, and repeating the securing of subsequent layers of feedstock by moving the stage in three dimensions until a desired height of the steel rule die is obtained, wherein the delivering feedstock to a substrate further comprises delivering feedstock with a sharpened profile for use as a cutting blade and delivering feedstock with a creased profile for use as a creasing blade.

22. A steel rule die producing method comprising delivering feedstock to a substrate that is secured to a stage that is movable in three dimensions, securing an initial layer of the feedstock to the substrate, moving the stage for creating a pattern with the deposited feedstock, securing a subsequent layer of feedstock to a previous layer of feedstock, and repeating the securing of subsequent layers of feedstock by moving the stage in three dimensions until a desired height of the steel rule die is obtained, further comprising trimming the feedstock with a tool prior to delivering the feedstock to the substrate.

23. A steel rule die producing method comprising delivering feedstock to a substrate that is secured to a stage that is movable in three dimensions, securing an initial layer of the feedstock to the substrate, moving the stage for creating a pattern with the deposited feedstock, securing a subsequent layer of feedstock to a previous layer of feedstock, and repeating the securing of subsequent layers of feedstock by moving the stage in three dimensions until a desired height of the steel rule die is obtained, further comprising trimming the feedstock with a tool after delivering the feedstock to the substrate.

24. The steel rule die of the process of claim 15.

25. A three-dimensional model building method, comprising:

(a) delivering feedstock through a feedstock dispensing nozzle and a clamp connected to the feedstock dispensing nozzle to a substrate that is secured to a stage that is movable in three dimensions;

(b) securing feedstock at a first position to the substrate while the clamp is engaged for creating the first end of a corrugated wave of dispensed feedstock;

(c) disengaging the clamp for releasing the feedstock from the clamp;

(d) moving the stage in an X-Y direction away from the dispensing nozzle for dispensing feedstock;

(e) engaging the clamp for gripping the feedstock;

(f) moving the stage in an X-Y direction back toward the dispensing nozzle for making the corrugated wave with the dispensed feedstock;

(g) securing the feedstock at a second end of the corrugated wave to the substrate; and (h) repeating steps (b) through (g) until the desired 3-D model is obtained.

26. The method of claim 25, wherein the delivering feedstock to a substrate comprises continuously delivering feedstock to a substrate.

27. The method of claim 25, wherein the securing the feedstock is selected from a group consisting of fusing, welding, brazing, soldering, and bonding.

28. The method of claim 25, further comprising moving the stage in the Z direction during steps (b) and (d) to aid in corrugating the 3-D model.

29. The method of claim 25, further comprising controlling the moving the stage and the engaging and disengaging of the clamp by a computer for controlling shaping of the 3-D model.

30. The method of claim 25, further comprising trimming the feedstock with a tool prior to step (a).

31. The method of claim 25, further comprising trimming the feedstock with a tool after step (a).

32. The apparatus of claim 5, wherein the treating is selected from the group consisting of trimming, milling, shaping, sharpening and combinations thereof.

* * * * *